(12) United States Patent
Bailey et al.

(10) Patent No.: US 7,877,471 B2
(45) Date of Patent: Jan. 25, 2011

(54) DETECTING SYSTEM RECONFIGURATION AND MAINTAINING PERSISTENT I/O CONFIGURATION DATA IN A CLUSTERED COMPUTER SYSTEM

(75) Inventors: David Alan Bailey, Johnston, IA (US); Timothy Roy Block, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 12/023,128

(22) Filed: Jan. 31, 2008

(65) Prior Publication Data

US 2009/0198807 A1  Aug. 6, 2009

(51) Int. Cl.
  *G06F 15/173* (2006.01)
  *G06F 15/16* (2006.01)
  *G06F 13/00* (2006.01)
  *G06F 1/00* (2006.01)

(52) U.S. Cl. ................ 709/223; 709/251; 710/100; 713/300

(58) Field of Classification Search ............. 709/223, 709/251; 710/100; 713/300
  See application file for complete search history.

(56) References Cited

U.S. PATENT DOCUMENTS

| | | | |
|---|---|---|---|
| 2002/0066045 A1* | 5/2002 | Layton et al. | 713/300 |
| 2002/0124128 A1* | 9/2002 | Qiu | 710/302 |
| 2003/0084154 A1* | 5/2003 | Bohrer et al. | 709/226 |
| 2005/0028000 A1* | 2/2005 | Bulusu et al. | 713/200 |
| 2005/0144261 A1* | 6/2005 | Nichols et al. | 709/220 |
| 2007/0210923 A1* | 9/2007 | Butler et al. | 340/572.8 |

* cited by examiner

*Primary Examiner*—Ranodhi N Serrao
(74) *Attorney, Agent, or Firm*—Martin & Associates, LLC; Derek P. Martin

(57) ABSTRACT

In a clustered computer system with multiple power domains, a bus number manager within each power domain manages multiple nodes independently of other power domains. A node within a specified power domain includes a non-volatile memory that includes bus numbering information for its own buses as well as bus numbering information for two of its logically-interconnected neighbors. This creates a distributed database of the interconnection topology for each power domain. Because a node contains bus numbering information about its logical neighbor node(s), the bus numbers for the buses in the nodes are made persistent across numerous different system reconfigurations. The clustered computer system also includes a bus number manager that reads the non-volatile memories in the nodes during initial program load (i.e., boot) that reconstructs the interconnection topology from the information read from the non-volatile memories, and that assigns bus numbers to the buses according to the derived interconnection topology.

4 Claims, 9 Drawing Sheets

DETECTING SYSTEM RECONFIGURATION AND MAINTAINING PERSISTENT I/O CONFIGURATION DATA IN A CLUSTERED COMPUTER SYSTEM

BACKGROUND

1. Technical Field

This disclosure generally relates to data processing, and more specifically relates to the assignment of I/O configuration data in a clustered computer system.

2. Background Art

Since the beginning of the computer age, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

One advance in computer systems includes clustering, or the connecting of multiple processors or servers together to cooperatively perform computer tasks as a large, unified computing resource. Clustering increases overall performance of a computing system since multiple processors can often handle a larger number of tasks in parallel than a single processor could. In addition, cluster systems are highly fault-tolerant, since if one system fails, the others keep working, and since clusters can span multiple geographic sites, remote machines will keep working even though an entire site may be lost through a power failure or other disaster.

A clustered computer system includes several different physical enclosures, or nodes, which may be interconnected through a network fabric. For example, one node may include system processors and memory, while other nodes include various different input/output (I/O) devices, such as hard disk drives, networking devices, etc. In known computer systems that include multiple physical enclosures, configuration data, such as bus numbers and other identification data for each enclosure, are written to a non-volatile memory within the enclosure. This allows the system to know what configuration data to assign during initial program load (i.e., boot).

One problem with the known method of storing configuration data in non-volatile memories in a cluster system is the scalability of cluster systems. That is, nodes may be upgraded, repaired, added to, or removed from the cluster. The configuration data in the non-volatile memory in each node will need to be persistent during maintenance and/or reconfiguration in order to be able to operate with the rest of the system and also for the other nodes on the network to remain operational in certain network topologies. The node may be manually reconfigured by a system administrator to recognize the new configuration data, but this could be expensive, and, in some cases, impractical, given the number of nodes that could be added to a cluster. In some cluster systems, an extra copy of the configuration data is stored in a separate non-volatile memory, but as the number of nodes that are added to the cluster system grows, the amount of memory that is needed to store configuration data also grows. One solution to controlling the size of memory in a cluster system is by providing a limited configuration of the nodes on the cluster system. Unfortunately this solution also limits the scalability of a cluster system.

Without a way to assign I/O configuration data in a cluster system that are persistent and can be automatically reassigned after a variety of different types of system reconfiguration and that allows for flexible scalability of the cluster system, the computer industry will continue to suffer from scaling issues within cluster systems.

BRIEF SUMMARY

In a clustered computer system with multiple bus number managers, each bus number manager manages multiple nodes independently of each other. Each node includes a non-volatile memory that includes bus numbering information for its own buses as well as bus numbering information for two of its logically-interconnected neighbors. This creates a distributed database of the logical interconnection topology for the cluster computer system. Because a node contains bus numbering information about its neighbor node(s), the bus numbers for the buses in the nodes are made persistent across numerous different system reconfigurations. The clustered computer system also includes a bus number manager that reads the non-volatile memories in the nodes during initial program load (i.e., boot), that reconstructs the interconnection topology from the information read from the non-volatile memories, and that assigns bus numbers to the buses according to the derived interconnection topology.

The foregoing and other features and advantages will be apparent from the following more particular description, as illustrated in the accompanying drawings.

BRIEF DESCRIPTION OF THE SEVERAL VIEWS OF THE DRAWINGS

The disclosure will be described in conjunction with the appended drawings, where like designations denote like elements, and.

DETAILED DESCRIPTION

1. Overview

Figure 1:
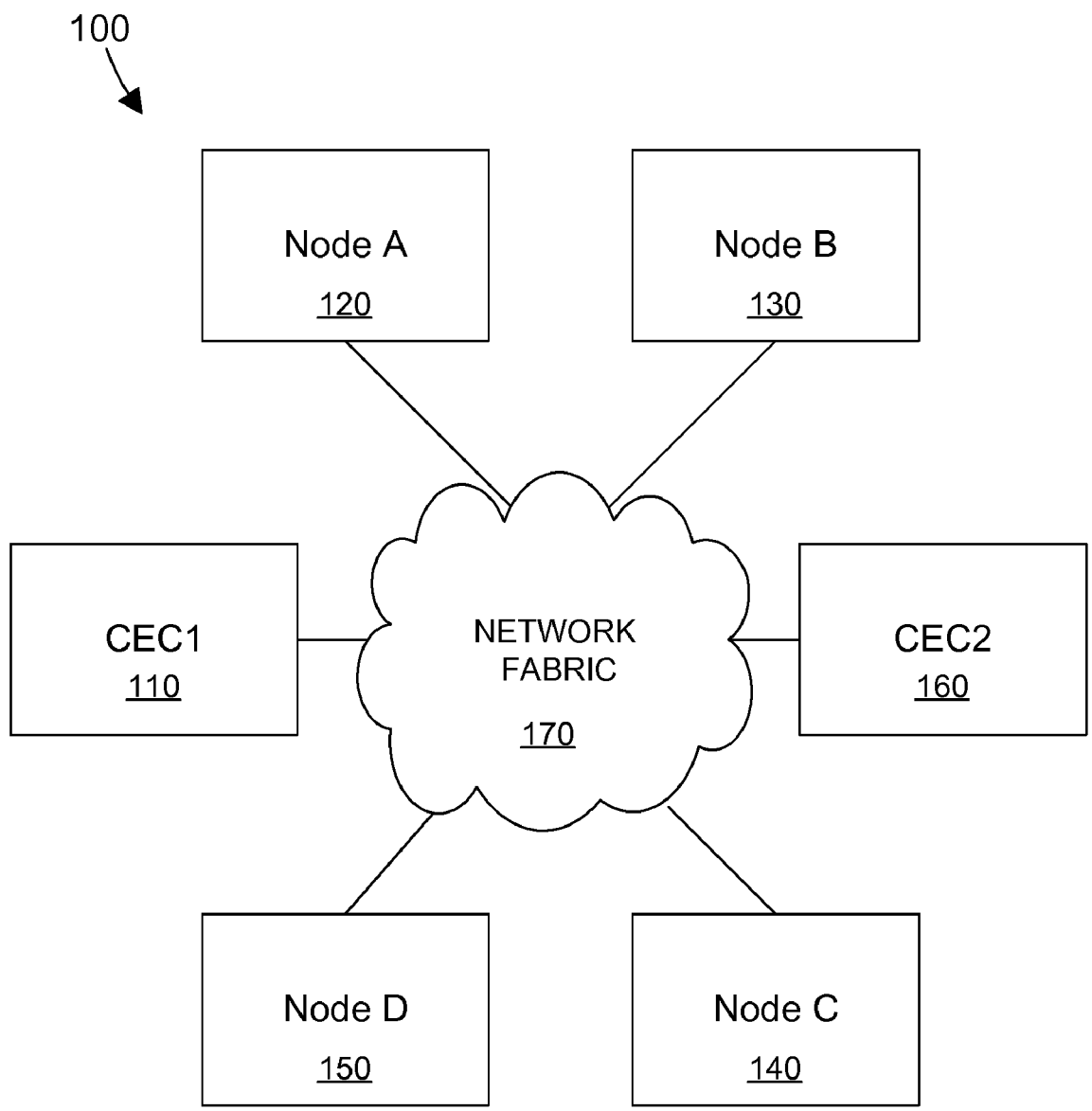
FIG. 1 is a block diagram of one specific configuration for a clustered computer system that includes two central electronics complexes (CECs) and four I/O drawer nodes.

An understanding of clustered computer systems helps to more fully understand the disclosure and claims herein. FIG. 1 shows a sample clustered computer system 100 that includes two central electronics complexes (CECs) 110 and 160, and four I/O drawer nodes, Node A 120, Node B 130, Node C 140, and Node D 150. The CECs and I/O drawer nodes are physically interconnected with one another via a network fabric 170. CECs 110 and 160 and individual nodes 120, 130, 140, and 150 may be physically located in close proximity with each other, or may be geographically separated from one another, as is well know in the art. An example of network fabric 170 may comprise a Remote Input/Output (RIO) loop, the use and configuration of which is well know in the art.

Figure 2:
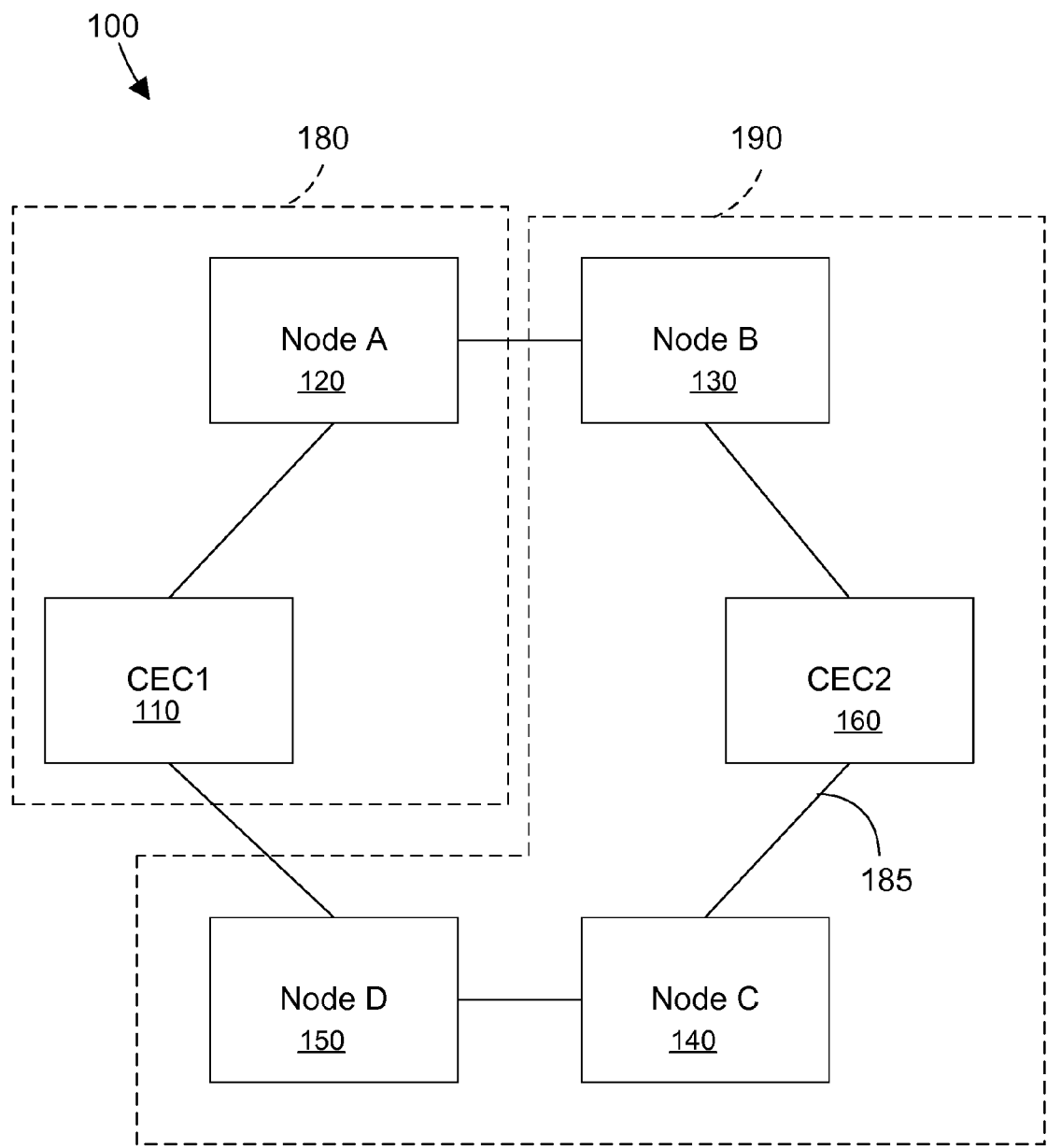
FIG. 2 is the block diagram of one specific configuration for a clustered computer system 100 of FIG. 1 that includes a remote I/O (RIO) loop and two power domains.

In FIG. 2, clustered computer system 100 includes CEC1 110, CEC2 160, and four I/O drawer nodes 120, 130, 140, and 150. In the specific configuration shown in FIG. 2, CEC1 110, Node A 120, Node B 130, CEC2 160, Node C 140, and Node D 150 are arranged through an RIO Loop 185 interconnection in a loop configuration. Clustered computer system 100 includes two power domains 180 and 190. A power domain as used herein means a system having master control to power off and power on each node in the power domain. CEC1 110 and Node A 120 reside in power domain 180. CEC2 160, Node B 130, Node C 140, and Node D 150 reside in power domain 190. In power domain 180, CEC1 110 has master control over Node A 120. That is, thru additional cabling or via RIO Loop 185, CEC1 110 may power off and on Node A 120. Likewise, in power domain 190, CEC2 160 has master control over Node B 130, Node C 140, and Node D 150, meaning CEC2 160 may independently power on or off any of Node B 130, Node C 140 and Node D 150.

Figure 3:
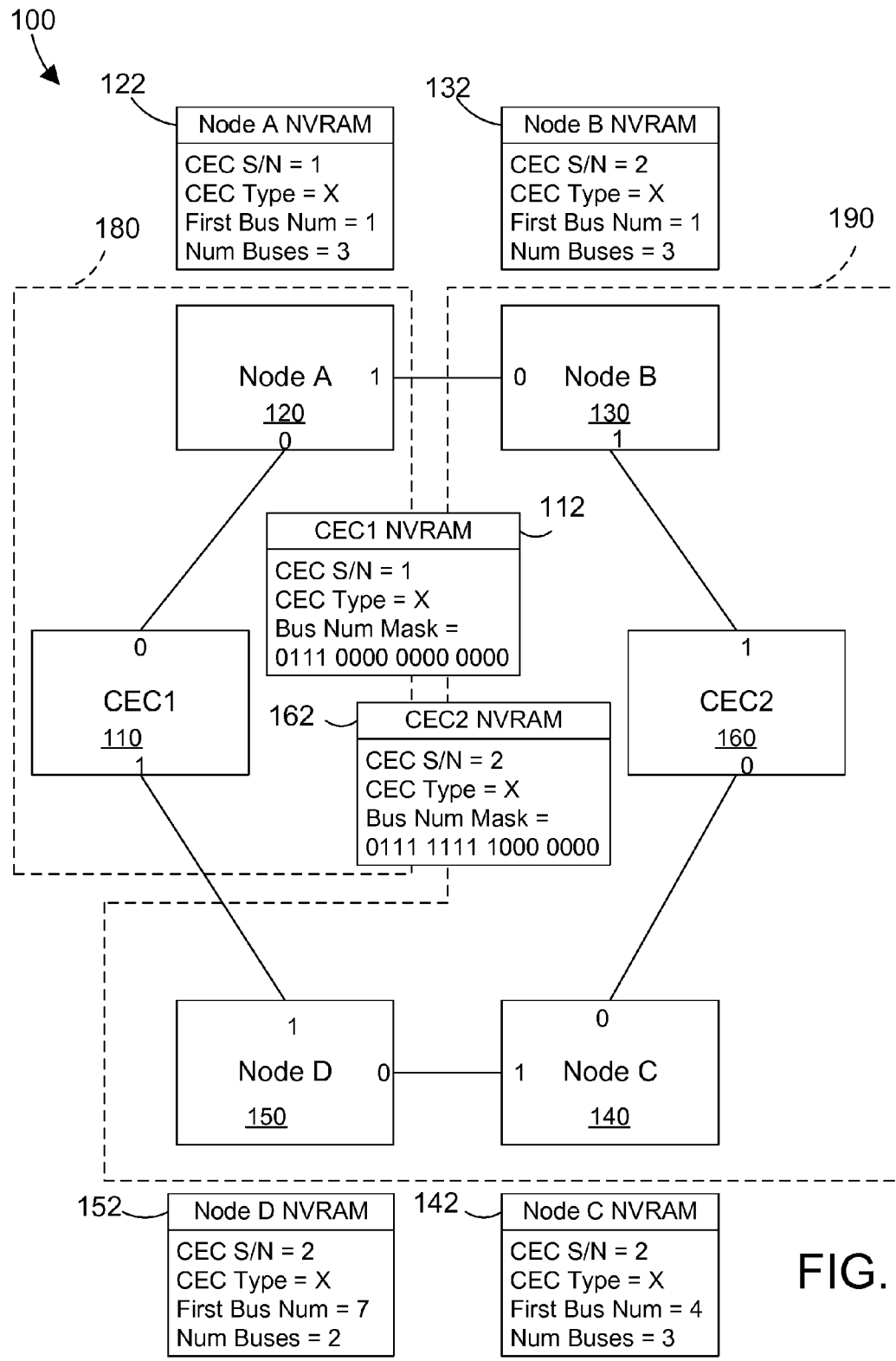
FIG. 3 is the block diagram of one specific configuration for the clustered computer system 100 of FIG. 2 that shows contents of non-volatile memory.

As seen in FIG. 3, CEC1 110 and CEC2 160 in clustered computer system 100 each include two ports labeled 0 and 1 for connection to I/O drawer nodes or other CEC enclosures. In similar fashion, each I/O drawer node includes two ports labeled 0 and 1 for connection to either CEC1 110, CEC2 160 and/or other I/O drawer nodes. As aforementioned, we assume CEC1 110, CEC2 160 and four nodes 120, 130, 140 and 150 are arranged in a loop configuration for this specific example.

Each I/O drawer node includes a non-volatile memory. Non-volatile Random Access Memories (NVRAMs) are shown in FIG. 3 as one specific type of non-volatile memory that could be used. Node A 120 contains NVRAM 122; Node B 130 contains NVRAM 132; Node C 140 contains NVRAM 142; and Node D 150 contains NVRAM 152. Each node NVRAM contains the serial number of the CEC in its power domain, the CEC type, the first bus number assigned in that node, and the number of buses in that node. Thus, we see from the information stored in Node A NVRAM 122 that Node A 120 has three buses (Num Buses=3), and the first of those buses is number one (First Bus Num=1). The bus numbering scheme assumes a range of contiguous bus numbers in a node. This means the three buses in Node A 120 are assigned bus numbers 1, 2 and 3.

In power domain 190, Node B NVRAM 132 indicates that Node B 130 has 3 buses, and the first of those buses is number 1. This means the three buses in Node B 130 are assigned bus numbers 1, 2 and 3. Node C NVRAM 142 indicates that Node C 140 has 3 buses, and the first of those buses is number 4. This means the three buses in Node C 140 are assigned bus numbers 4, 5 and 6. Node D NVRAM 152 indicates that Node D 150 has 2 buses, and the first of those buses is number 7. This means the two buses in Node D 150 are assigned bus numbers 7 and 8.

In power domain 180, CEC1 110 includes an NVRAM 112 that includes the serial number of the CEC, the CEC type, and a bus number mask. The bus number mask is a string of bits that each represents a bus number. When a bus number has been assigned, its corresponding bit is set to one in the bus number mask. The left-most bit represents bus number zero, the next bit represents bus number one, etc. Thus, with buses 1-3 assigned to Node A as described in the preceding paragraphs, we see that the bus number mask has bits 1-3 set to one, with bits 0 and bits greater than 3 all set to zero, indicating that bus numbers 1-3 have been assigned.

In power domain 190, CEC2 160 also includes an NVRAM 162 that includes the serial number of the CEC, the CEC type, and the bus number mask. In power domain 190, buses 1-8 were assigned to the nodes as described in the preceding paragraphs. We see that the bus number mask has bits 1-8 set to one, with bits 0 and bits greater than 8 all set to zero, indicating that bus numbers 1-8 have been assigned.

Figure 4:
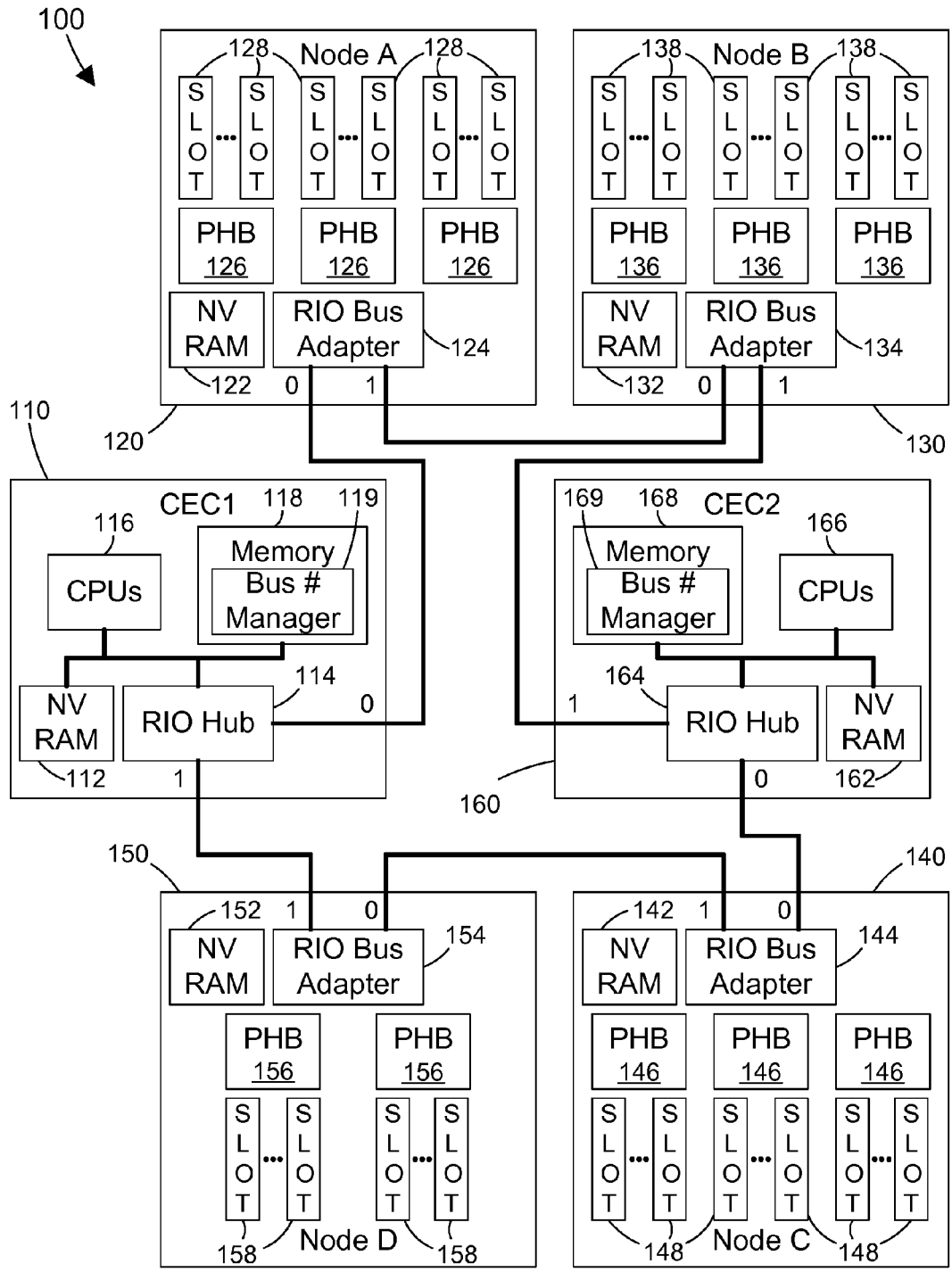
FIG. 4 is a more detailed block diagram of one specific configuration for the clustered computer system 100 in FIG. 2 showing some of the internal components in the CECs and each I/O drawer node.

More details of clustered computer system 100 are shown in the block diagram of FIG. 4. CEC1 110 preferably includes one or more CPUs 116, memory 118, NVRAM 112, and a RIO hub 114. Each CPU 116 may be constructed from one or more microprocessors and/or integrated circuits. CPUs 116 execute program instructions stored in memory 118. Memory 118 stores programs and data that CPUs 116 may access. Memory 118 preferably includes a bus number manager 119 that is executed by one or more CPUs 116 during initial program load to assign bus numbers to buses in the system. NVRAM 112 contains information that identifies the serial number and type of CEC, and that includes the bus number mask, as shown in FIG. 3. RIO hub 114 provides two ports labeled 0 and 1 for connecting the CEC 110 to one or more I/O drawer nodes.

Similarly, CEC2 160 preferably includes one or more CPUs 166, memory 168, NVRAM 162, and a RIO hub 164. Each CPU 166 may be constructed from one or more microprocessors and/or integrated circuits. CPUs 166 execute program instructions stored in memory 168. Memory 168 stores programs and data that CPUs 166 may access. Memory 168 preferably includes a bus number manager 169 that is executed by one or more CPUs 166 during initial program load to assign bus numbers to buses in the system. NVRAM 162 contains information that identifies the serial number and type of CEC, and that includes the bus number mask, as shown in FIG. 3. RIO hub 164 provides two ports labeled 0 and 1 for connecting the CEC2 160 to one or more I/O drawer nodes.

Each I/O drawer node includes a remote I/O (RIO) bus adapter that has two ports labeled 0 and 1 for connecting to a CEC and/or other nodes. Each node includes one or more PCI host bridges coupled to the RIO bus adapter. The PCI host bridge within a node is what is assigned a persistent bus number that is stored in non-volatile memory. Each PCI host bridge may be coupled to one or more I/O slots that may each receive a compatible I/O adapter. Node A 120 thus includes an RIO bus adapter 124 that has port 0 coupled to port 0 of the RIO hub 114 in CEC1 110, and that has port 1 coupled to port 0 of the RIO bus adapter 134 in Node B 130. The RIO bus adapter 124 is coupled to three PCI host bridges 126, which correspond to the three numbered buses in Node A 120. Each PCI host bridge 126 may be coupled to one or more I/O slots 128, which may each contain a compatible I/O adapter.

The configuration of Node B 130 is similar to the configuration for Node A 120. Node B 130 has an RIO bus adapter 134 coupled to three PCI host bridges 136 that correspond to the numbered buses in Node B 130. PCI host bridges 136 are coupled to slots 138. Node B also includes NVRAM 132, which contains the contents shown in FIG. 3. RIO bus adapter 134 has port 0 coupled to port 1 of the RIO bus adapter 124 in Node A 120 and has port 1 coupled to port 1 of the RIO bus hub 164 in CEC2 160. The configuration of Node C 140 is also similar to the configuration for Nodes A 120 and B 130. Node C 140 has an RIO bus adapter 144 coupled to three PCI host bridges 146 that correspond to the numbered buses in Node C 140. PCI host bridges 146 are coupled to slots 148. Node C also includes NVRAM 142, which contains the contents shown in FIG. 3. RIO bus adapter 144 has port 0 coupled to port 0 of the RIO bus hub 164 in CEC2 160 and has port 1 coupled to port 0 of the RIO bus adapter 154 in Node D 150.

The configuration of Node D 150 differs from the other nodes, because in this specific example Node D only has two buses instead of the three buses in each of Nodes A 120, B 130 and C 140. Node D 150 has an RIO bus adapter 154 coupled to two PCI host bridges 156 that correspond to the numbered buses in Node D 150. PCI host bridges 156 are coupled to slots 158. Node D also includes NVRAM 152, which contains the contents shown in FIG. 3. RIO bus adapter 154 has port 0 coupled to port 1 of the RIO bus adapter 144 in Node C 140 and has port 1 coupled to port 1 of the RIO bus hub 114 in CEC1 110.

Note that the connection topology is a loop because it starts at one port of the first CEC, loops through two nodes, loops through the second CEC and loops through the other two nodes back to the other port of the first CEC.

The specific configuration in FIG. 4 shows the use of PCI buses in a computer system. Note, however, that the disclosure is not limited to PCI buses, but expressly extend to any type of bus, whether currently known or developed in the future, that requires a unique bus number to be assigned.

2. Detailed Description

It is well-understood that the physical loop topology as shown in FIG. 2 in clustered computer system 100 will continue to grow as new clusters and nodes are added on to the system. The disclosure and claims herein solve the problem of not having to limit the amount of nodes that can be provided to a system, or retain an increasingly large amount of memory to keep track of the configuration data by distributing the configuration data to each of the nodes. Each node is only required to hold (for scalability) right and left neighboring I/O drawer node data in its memory. The right and left neighbors of each node is determined through the concept of a logical loop topology based on the nodes in a system's power domain rather than basing the definition on a physical loop topology. Although in the following examples, bus numbering data will be specifically used for persistent configuration data, it is to be understood that other acceptable configuration data may be used and is within the scope of the disclosure and the claims.

Figure 5:
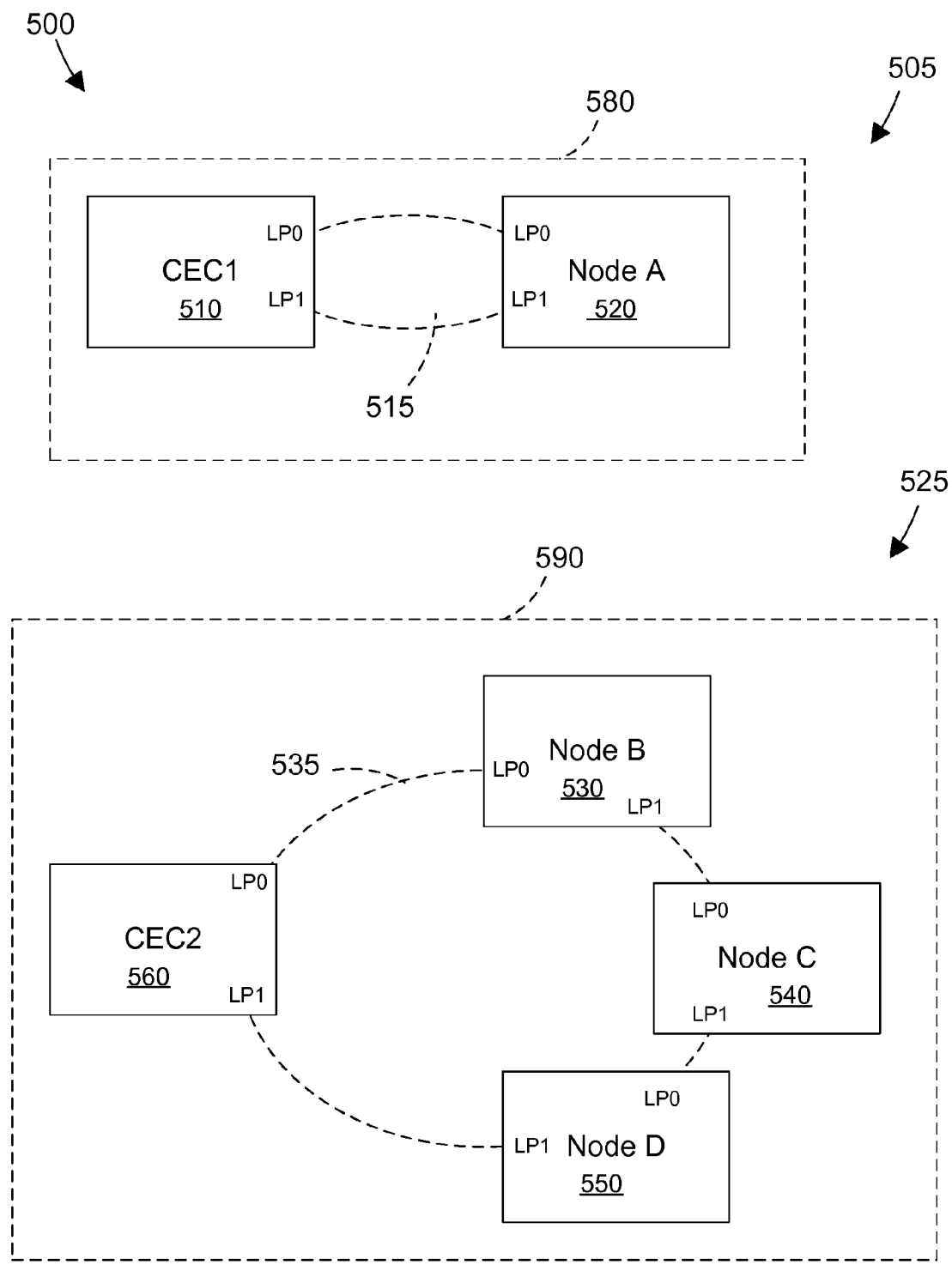
FIG. 5 is a block diagram of the clustered computer system formed into two distinct logical loop topologies that include two CECs and four I/O drawer nodes.

FIG. 5 illustrates how clustered computer system 100 in FIG. 2 may be divided into two distinct logical loop topologies 505 and 525 based on power domains 580 and 590 (corresponding to power domains 180 and 190 in FIG. 2). CEC1 510 and Node A 520 in power domain 580 form a first independent loop topology 505 through logical loop 515. CEC2 560, Node B 530, Node C 540, and Node D 550 in power domain 590 form a second independent loop topology 525 through logical loop 535. CEC1 510 and CEC2 520, which also may be referred to as power domain managers, logically arrange each I/O drawer node in its power domain, forming logical ports (LP0 and LP1) to indicate to each node its right and left neighbor. Note that FIG. 5 shows two virtual loops that indicate power domains for the physical loop shown in FIG. 2.

Figure 6:
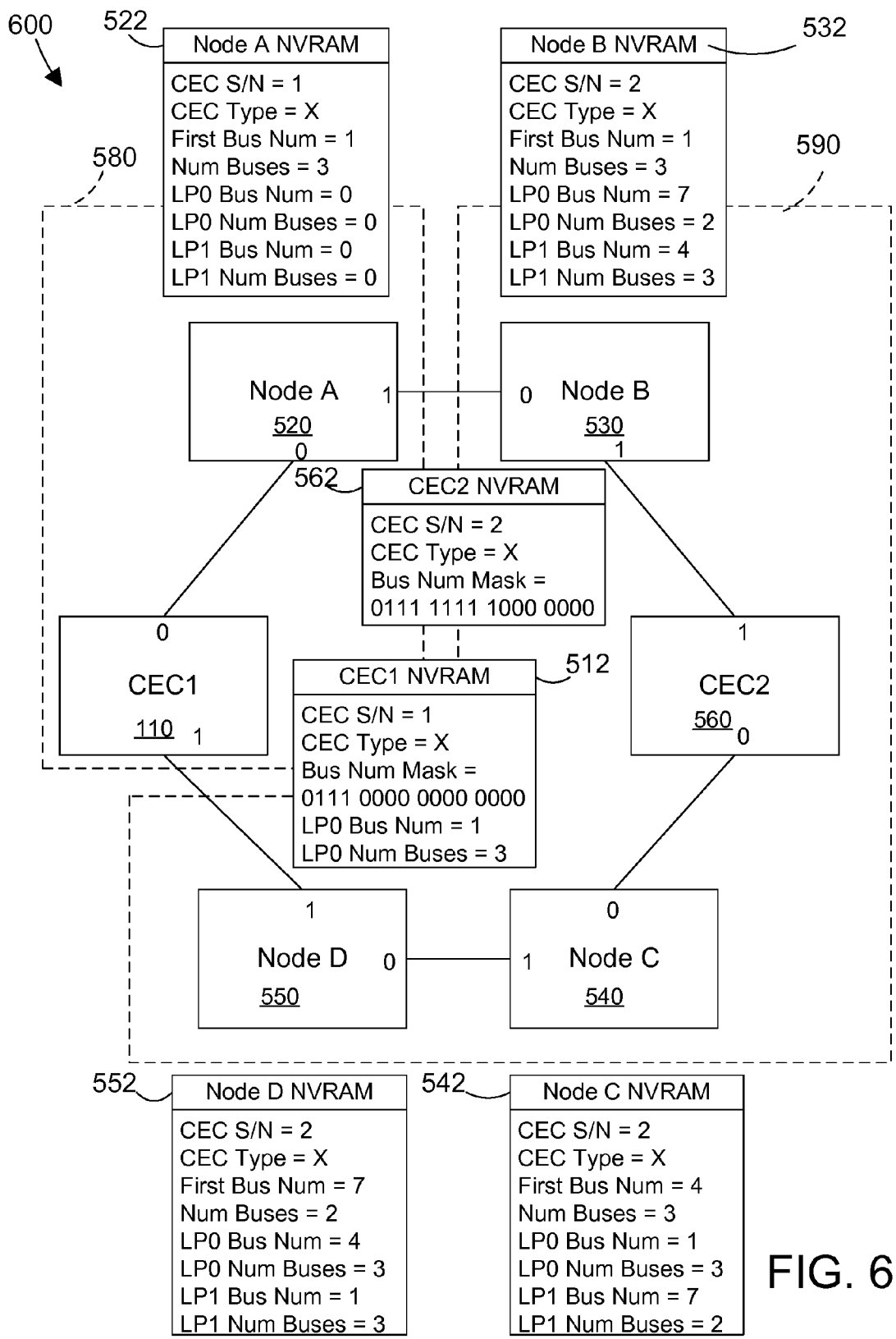
FIG. 6 is a block diagram of the clustered computer system of FIG. 5 formed into one physical loop topology.

Referring to FIG. 6, a clustered system 600 is similar in many respects to clustered computer system 100 in FIG. 3. CEC1 510 and CEC2 560 are connected to four nodes 520, 530, 540 and 550 in a loop as shown. CEC2 NVRAM 562 has not changed, and includes the CEC serial number, the CEC type, and the bus number mask. CEC1 NVRAM 512 includes neighbor configuration data for Node A 520 since Node A 520 is a single I/O drawer node in the power domain. That is, CEC1 510 will act as the left and right neighbor to Node A 520. The primary difference between clustered computer system 600 in FIG. 6 and clustered computer system 100 in FIG. 3 is what is stored in the non-volatile memory in each I/O drawer node based on the logical loop topology shown in FIG. 5, and how the bus number manager uses that information to assign bus numbers during initial program load. In FIG. 6, the non-volatile memory in each node contains not only bus numbering information for its own buses, but also contains bus numbering information for its logical neighbors as well. Thus, Node A NVRAM 522 contains the CEC serial number, CEC type, First Bus Num, and Num Buses, which is the same information shown in Node A NVRAM 122 in FIG. 3. Note, however, that Node A NVRAM 522 additionally includes a first bus number and number of buses for the logical neighbors identified through logical ports LP0 and LP1 in FIG. 5. In this example, LP0 Bus Num=0, LP0 Num Buses, LP1 Bus Num=0, and LP1 Num Buses=0 since Node A is the only I/O drawer node within power domain 580. As aforementioned, CEC1 NVRAM 512 includes neighbor configuration data for Node A 520 and will act as the left and right neighbor to Node A 520.

Node B NVRAM 532 contains bus numbering information for its own buses (First Num Bus=1, Num Buses=3), and also contains bus numbering information for its logical neighbors as seen in FIG. 5, Node D 550 (LP0 Bus Num=7, LP0 Num Buses=2) and Node C 540 (LP1 Bus Num=4, LP1 Bus Num=3). Even though Node B 530 is physically attached to Node A 520, Node B 530 does not contain Bus numbering information for Node A 520 because Node A is in a separate power domain. Thus, Node D 550 is the logical neighbor of Node B 530 even though physically they do not connect, as seen in FIG. 5. Node B NVRAM 532 also contains the CEC serial number, CEC type, First Bus Num, and Num Buses, which is the same information shown in Node B NVRAM 132 in FIG. 3. Note that CEC2 560 contains none of the type of buses that are being numbered elsewhere in the system, so CEC2 560 is ignored, and Node B NVRAM 532 provides the information as if its logical port 1 is coupled directly to logical port 0 of Node C 540. Thus we see that the LP1 Bus Num=4 and LP1 Num Buses=3 describes the bus numbering information for Node C 540 which is coupled through CEC2 560 to logical port 1 of Node B 530. In similar fashion, Node C NVRAM 542 provides bus numbering information for its own buses (First Num Bus=4, Num Buses=3), and also contains bus numbering information for its logical neighbors, Node B (LP0 Bus Num=1 and LP0 Num Buses=3) and Node D 550 (LP1 Bus Num=7 and LP1 Num Buses=2). Node D NVRAM 552 contains bus numbering information for its own buses (First Num Bus=7, Num Buses=2), and also contains bus numbering information for its logical neighbors, Node C

540 (LP0 Bus Num=4, LP0 Num Buses=3) and Node B 530 (LP1 Bus Num=1, LP1 Num Buses=3). In this manner, each node contains in non-volatile memory bus numbering information for its logical neighbor nodes as well as for its own buses. This differs from known prior art systems that store persistent I/O information for its physical neighbors in the loop without regard to whether a physical neighbor is in the same or a different power domain. As used herein, the term "logical neighbors" means two nodes that are logically connected in the same power domain, even if one or more nodes from other power domains are physically located between the logical neighbors. Note the physical connections between neighbors in the loop network implies direct connections regardless of whether those connections are via a wire or wireless interface, and the terms "physical connection" or "direct connection" should not be construed as requiring a hard wire connection.

Figure 7:
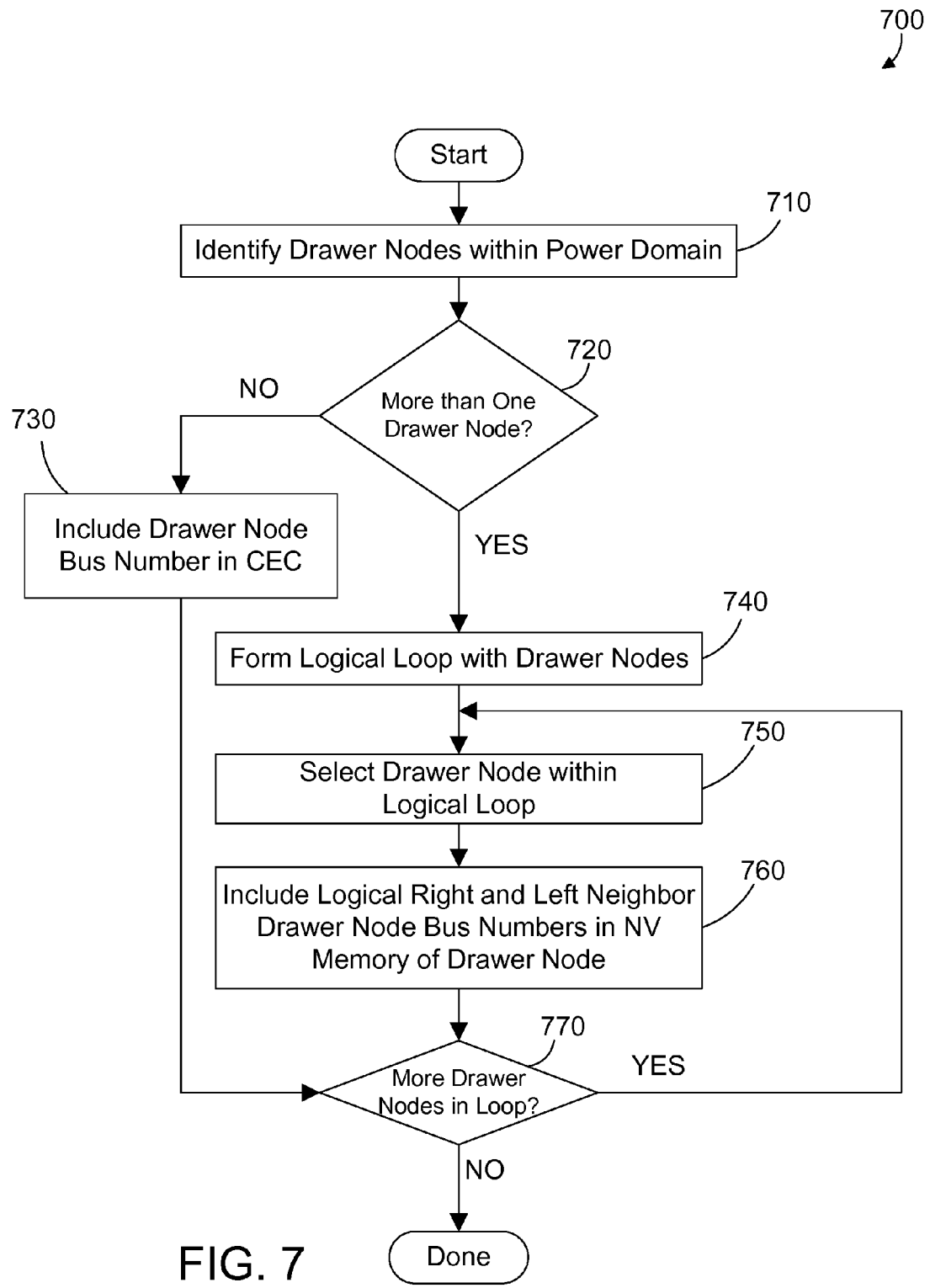
FIG. 7 is a flow diagram of a method for forming the logical loop topologies of FIG. 5 and NVRAM contents of FIG. 6.

Referring now to FIG. 7, a method 700 for a bus number manager of clustered computer system 100 in FIG. 2 to independently form a logical loop topology begins by identifying the drawer nodes within its power domain (step 710). If there is only one drawer node in its power domain (step 720=NO), the node bus number of the drawer node is included in the NVRAM of the CEC (step 730). However, if there is more than one drawer node in its power domain (step 720=YES) a logical loop is formed with the drawer nodes (step 740), wherein logical right and left neighbors are formed with each drawer node. A drawer node is then selected within the logical loop (step 750) and the logical right and left neighbor drawer node bus numbers and the number of buses is stored in the NV Memory of the selected drawer node (step 760). Step 770 determines whether or not there are more drawer nodes to process. If so (step 770=YES), method 700 loops back to step 750 and continues until there are no more nodes to process (step 770=NO).

We now apply method 700 in FIG. 7 to clustered computer system 100 in FIG. 2. Although we will apply method 700 to each of the power domains sequentially, it is to be understood that method 700 could also occur simultaneously with both power domains. Starting with power domain 180 of FIG. 2, drawer Node A 120 is identified (step 710) and since there are no more I/O drawer nodes in power domain 180 (step 720=NO), CEC1 110 stores the node bus numbers of Node A (LP0 Bus Num=1 and LP0 Num Buses=3) (step 730) and forms a logical loop with Node A by becoming both its left and right neighbor, resulting in loop topology 505 with CEC1 510 and Node A 520 as shown in FIG. 5. The resulting content stored in CEC1 NVRAM 522 is shown in FIG. 6 (LP0 Bus Num=1, and LP0 Num Buses=3), which allows the I/O configuration data of Node A to persist through CEC1 510. Since there are no more nodes in the loop (step 770=NO) method 700 is done for this power domain.

Applying method 700 to power domain 190 of FIG. 2, Node B 130, Node C 140 and Node D 150 are identified as the drawer nodes within power domain 190 (step 710). Since there is more than one drawer node (step 720=YES), a logical loop is formed with Node B, Node C and Node D (step 740). These drawer nodes are shown in FIG. 5 as Node B 530, Node C 540, and Node D 550. Node B 530 is then selected (step 750) and as seen in FIG. 6 the logical right and left neighbor node bus numbers (LP0 Bus Num=7, LP0 Num Buses=2, LP1 Bus Num=4, and LP1 Num Bus=3) are stored in Node B NVRAM 535 (step 760). Thus, Node B NVRAM 532 contains not only its own Bus Numbers, but those of Node C 540 and Node D 550. Since there are more drawer nodes in the loop (step 770=YES) method 700 loops back to step 750 and Node C is then selected (step 750). As seen in FIG. 6, the logical right and left neighbor node bus numbers (LP0 Bus Num=1, LP0 Num Buses=3, LP1 Bus Num=7, and LP1 Num Bus=2) are stored in Node C NVRAM 542 (step 760). Thus, Node C NVRAM 542 contains not only its own Bus Numbers, but those of Node B 530 and Node D 550. Since there are more nodes in the loop (step 770=YES) method 700 loops back to step 750 and Node D is then selected (step 750). As seen in FIG. 6, the logical right and left neighbor node bus numbers (LP0 Bus Num=41, LP0 Num Buses=3, LP1 Bus Num=1, and LP1 Num Bus=3) are stored in Node D NVRAM 552 (step 760). Thus, Node D NVRAM 552 contains not only its own Bus Numbers, but those of Node B 530 and Node C 540. Since there are no more drawer nodes in the loop (step 770=NO) method 700 is done for this power domain.

The result of processing system 100 in FIG. 2 using method 700 in FIG. 7 is the independent loop topologies 505 and 525 of FIG. 5 with the contents of each drawer node's NVRAMS as shown in FIG. 6. Forming independent loop topologies in clustered computer systems allows for autonomic persistence of configuration data in a scalable manner.

Figure 8:
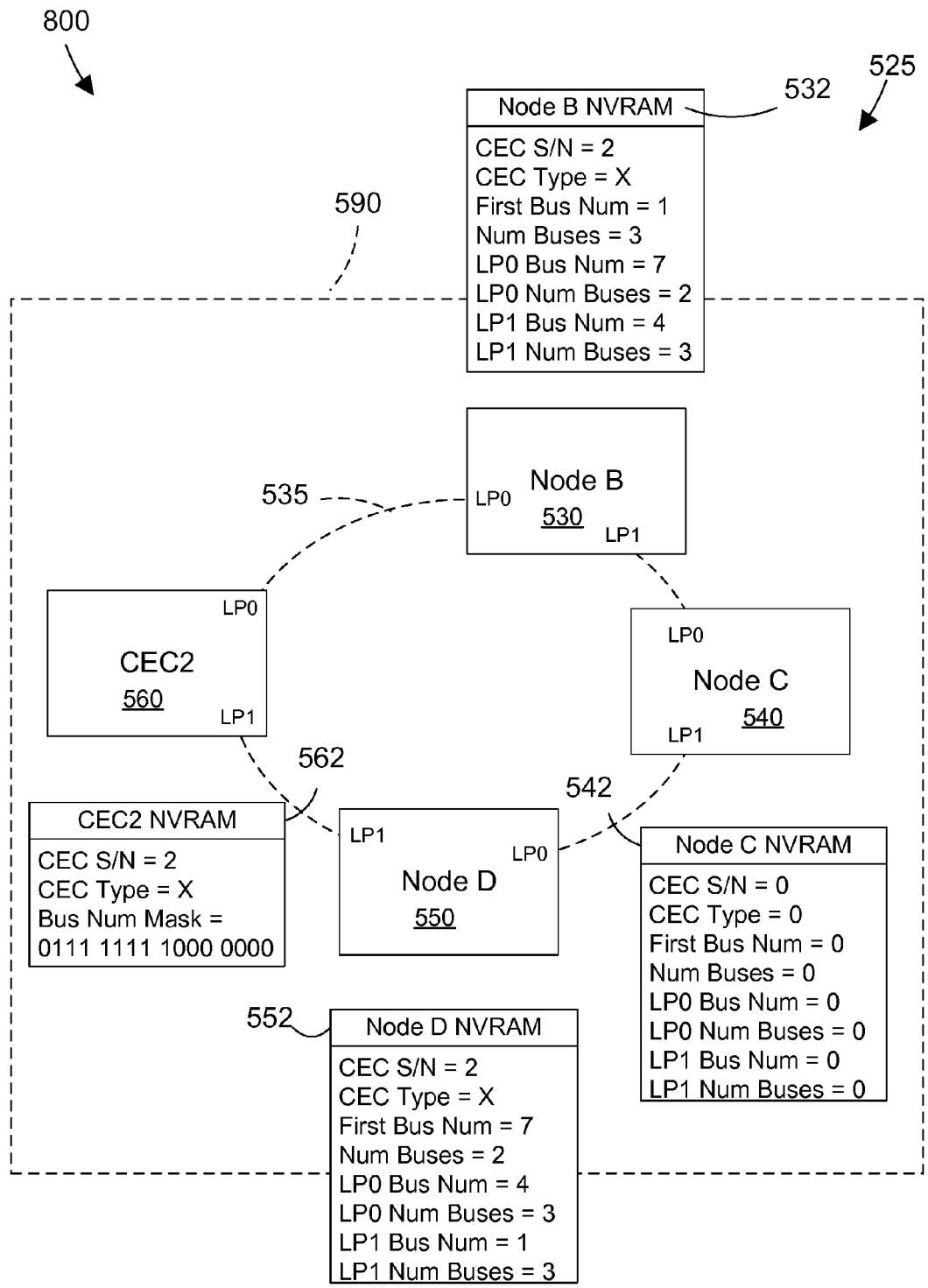
FIG. 8 is a block diagram of one logical loop topology of the clustered computer system of FIG. 5 after hardware that includes the non-volatile memory has been upgraded in Node C.
Figure 9:
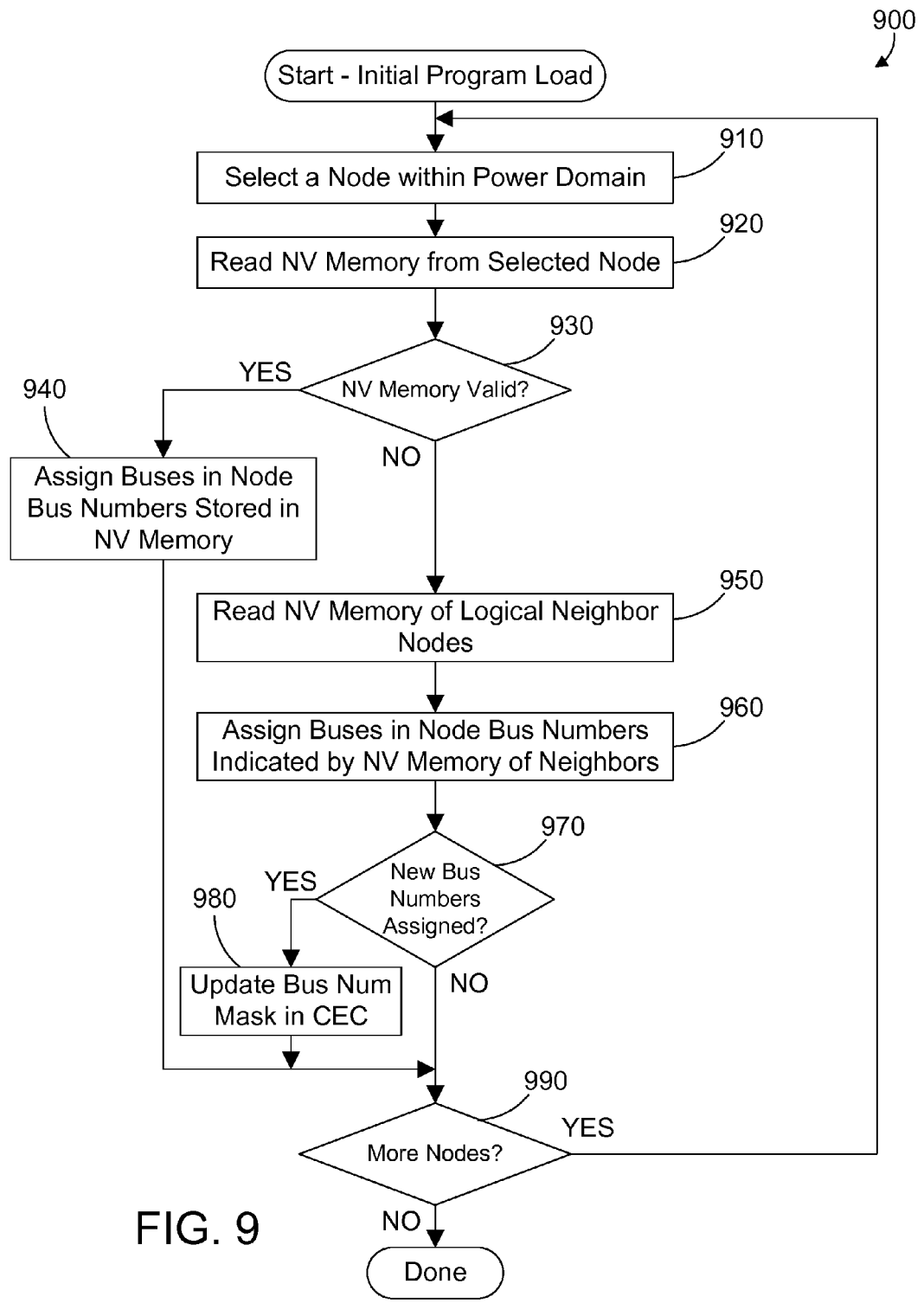
FIG. 9 is a flow diagram of a method for assigning bus numbers during initial program load to a logical loop topology.

Now we assume an upgrade is done to Node C 540 shown in FIG. 6 wherein the hardware that includes Node C NVRAM 542 is replaced, but all the other hardware within Node C 540 remains unchanged. As shown in FIG. 8, power domain 590 forms logical loop topology 525 through the method described in FIG. 7. As seen in FIG. 8, an upgrade of Node C 540 causes Node C NVRAM 542 to contain zeroes instead of valid bus numbering information. Referring now to FIG. 9, a method 900 for the bus number manager within a power domain to assign bus numbers during initial program load (IPL) begins by selecting a node within that same power domain (step 910). The non-volatile memory for that node is read (step 920). If the data read from the non-volatile memory is valid (step 930=YES), the buses are assigned the bus numbers indicated by the bus numbering information (step 940). However, if the non-volatile memory is not valid (step 930=NO), the non-volatile memory of the logical neighbor nodes are read (step 950). Bus numbers are then assigned based on the bus numbering information that is located in the non-volatile memory of the logical neighboring nodes (step 960). If new bus numbers were assigned in step 960 (step 970=YES), the bus number mask in the CEC2 NVRAM 560 is updated (step 980) to reflect the newly assigned bus numbers. If no new bus numbers were assigned in step 960 (step 970=NO), step 990 determines whether or not there are more nodes to process. If so (step 990=YES), method 900 loops back to step 910 and continues until there are no more nodes to process (step 990=NO).

We now apply method 900 in FIG. 9 to the reconfigured system 800 in FIG. 8. We assume that Node B 530 is initially selected in step 910. Node B NVRAM 532 is read (step 920), and it is determined that the data read from Node B NVRAM 532 is valid (step 930=YES). The three buses in Node B 530 are then assigned bus numbers 1, 2 and 3 (step 940), because the data read from the node B NVRAM 532 indicates that the first bus number is 1 and the number of buses is 3. There are more nodes to process (step 990=YES), so Node C 540 is then selected in step 910. Node C NVRAM 542 is read (step 920), and it is determined that the data read from Node C NVRAM 542 is invalid (step 930=NO) because the CEC serial number and CEC type do not match the values stored in CEC2 NVRAM 562. At this point the non-volatile memory of the logical neighbors nodes are read (step 950). Thus, step 950 reads Node B NVRAM 532 and Node D NVRAM 552. It determines from the contents of these NVRAMs (provided they match) that Node C 540 has a first bus number of 4 and has three buses. As a result, the three buses in Node C 540 are assigned bus numbers 4, 5 and 6 (step 960). No new bus numbers were assigned in step 960 (step 970=NO), so no update to the bus number mask is required. There is still one more node to process (step 990=YES), so method 900 loops back and selects Node D 550 (step 910). Node D NVRAM 552 is then read (step 920), and it is determined that the data read is valid (step 930=YES). The buses in Node D 550 are assigned bus numbers 7 and 8 (step 940), because the data read from Node D NVRAM 552 indicates that the first bus number is 7 and the number of buses is 2. There are no more nodes to process (step 990=NO), so method 900 is done.

The result of processing system 800 in FIG. 8 using method 900 in FIG. 9 is system 600 shown in FIG. 6. In other words, the clustered computer system 600 has autonomically persisted the bus numbers even though there has been a system reconfiguration. Note that the term "system reconfiguration" herein may include any hardware change that may affect bus numbering, and may also include any change to firmware or other system changes that may affect assignment of bus numbers during initial program load.

The disclosure also includes a user interface that may be used to reset bus numbers that are no longer being used. For example, let's assume that the upgrade to Node C 540 not only upgraded to NVRAM 542, but also added one additional bus. In this case, the old bus numbers of 4, 5 and 6 could not be used because there are now four buses in Node C 540, and bus 7 has already been assigned to Node D 550. As a result, the addition of a fourth bus to Node C 540 would cause the bus number manager to assign bus numbers 9, 10, 11 and 12 to the buses in Node C 540. As a result, bus numbers 4, 5 and 6 are no longer in use. Using a user interface, a system administrator could manually reset the bits for bus numbers 4, 5 and 6 in the bus mask in CEC NVRAM 562 to zeroes to indicate these bus numbers may be reused.

At this point, it is important to note that while the description above is in the context of a fully functional clustered computer system, those skilled in the art will appreciate that the bus number managers disclosed herein may be distributed as an article of manufacture in a variety of forms, and the claims extend to all suitable types of computer-readable media used to actually carry out the distribution, including recordable media such as floppy disks and CD-RW.

The clustered computer system herein may also be delivered as part of a service engagement with a client corporation, nonprofit organization, government entity, internal organizational structure, or the like. This may include configuring a computer system to perform some or all of the methods described herein, and deploying software, hardware, and web services that implement some or all of the methods described herein. This may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Traversing the nodes and reading their non-volatile memories allows reconstruction of an interconnection topology cluster system that the bus number manager can use to determine whether and how I/O drawer nodes in the system have been reconfigured. Several scenarios are presented below to show the flexibility and versatility in autonomically assigning bus numbers based on the persistent bus numbering information stored in each node for itself and for its logical neighbors. Before any of these scenarios take place in a clustered computer system, logical loops are first formed as determined by the power domains of the clustered system as discussed in reference to FIG. 7, and each scenario may be performed independently for each logical loop. The term "hot" refers to changes that occur while the system is running. In a hot change, system code could potentially participate in service operations that change the configuration. Thus, a particular node, or several nodes, could be powered off to perform the reconfiguration or a service operation while the system is still running. The term "cold" refers to changes that occur when the system is powered off and no system code is active.

Missing Node

To handle missing nodes in a logical loop, the bus number manager uses the persistent bus numbering information in the two logical neighbor nodes to determine that a node is missing. The bus number manager may then cause an error to be posted to an Error Log stating that a node is missing, or that a cable is missing, whichever the case may be. The non-volatile memory in the two adjacent logical nodes is not changed until either the loop is completed or a node is powered on in this position. The case where a node is missing and the loop is complete is treated as a Cold Node Remove, discussed below under Hot and Cold Node Remove. The case where a node was missing and then a new node is added in its place is discussed below under the Hot and Cold Node Replace.

Hot and Cold Node Add

For a Cold Node Add, the system within a power domain will power on with a node that either has no NVRAM data or has invalid NVRAM data. The data in the existing nodes is used to determine that a node was inserted. New bus numbers are assigned by the bus number manager to this added node. The data in the neighboring logical nodes' non-volatile memories are updated to reflect the addition of the node.

For a Hot Node Add, after the node is recognized as new, the bus number manager may assign bus numbers in the node, and the data in the neighboring logical nodes's non-volatile memories are updated to reflect the addition of the new node. Note that if the added node has valid bus numbering information for this CEC, this case is handled under the Node Move case discussed below.

Hot and Cold Node Replace

To increase tolerance to backplane requirements and node replacement, the bus number manager will also use the bus numbering information in the two neighboring nodes. For the Cold Node Replace case, if a node does not have valid bus numbers in its own non-volatile memory, then the bus number manager will query the logical neighbors' non-volatile memory. If only one of the logical neighbors' data is valid, then that data is used. If both are invalid, then new bus numbers are assigned by the bus number manager. If both are valid but don't match, then new bus numbers will be requested. In the case of a Hot Node Replace, the bus number manager may assign bus numbers when the replaced node appears.

Hot and Cold Node Move

For a Hot Node Move within a logical loop, the remove part of moving the node will be treated the same as a Hot Remove discussed below, and the addition of the node to a new location in the loop will be treated similar to a Hot Node Add discussed above. The one difference is that device drivers for the PCI cards in this node already exist. System software can either redirect the target of the device drivers from one location in the logical loop to another, or it can delete the device driver when the node is removed, and re-create the device driver when the node is added back into the loop. For Cold Node Remove within a logical loop, on the next IPL the logical loop must repair its next and previous bus numbers in the adjacent nodes (same as a Cold Remove), and the logical loop must do the same to integrate the new node, while retaining the same bus number for the moved node (same as Cold Add).

Hot and Cold Node Remove

When a node is Hot Removed, the power domain system code needs to be called as the node is powered off and removed. This code must remove the device drivers, the PCI host bridges, the PCI buses, and also remove the bus numbers. Then the non-volatile memory in the neighboring nodes must be changed to reflect the node was removed from the logical loop. When a node is Cold Removed, the missing node will be detected on the next IPL. If the loop is complete, the non-volatile memory in the neighboring logical nodes will be changed to reflect the new configuration. If the loop is not complete, this new configuration will be treated as a missing node, discussed above.

In the various scenarios discussed above, we assume only one change is made at a time so the single change can be detected and appropriate actions taken based on the single change. If multiple changes are made, the system may act differently. For example, if during a single cold power-down cycle a drawer is repaired so its NVRAM contents are not valid, and the same drawer is also moved within a logical loop, the CEC will not be able tell that the moved drawer is the old drawer, and new bus numbers will be assigned to the moved drawer as if it were a new drawer. By limiting to one change at a time, the system disclosed herein can adequately configure itself as described in the many examples above.

The disclosure provides a significant advance over the prior art by forming a logical loop in a clustered system and providing bus numbering information in each node for that node and for its neighbor nodes. Because neighbor nodes include bus numbering information, the same persistent bus numbers may be reassigned after a system reconfiguration by reading the bus numbering information from the non-volatile memory in the logical neighbor nodes. In this manner, the disclosure autonomically assigns and persists bus numbers in a clustered computer system that includes multiple physical nodes and possibly includes multiple power domains. Also, by forming logical loops, a clustered computer system may remain flexible and scalable while allowing for distributed and persistent I/O configuration data.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, while the examples in the figures and discussed above related to PCI buses, the disclosure and claims herein expressly extend to other types of buses that could be persistently numbered, whether currently known or developed in the future.

What is claimed is:

1. A clustered computer system comprising:
    a first power domain manager comprising a first processor coupled to a first memory, a second power domain manager comprising a second processor coupled to a second memory, and a plurality of nodes all coupled together via a plurality of buses in a loop network, wherein the first power domain manager can individually power on and power off any of a first plurality of nodes in the loop network and the second power domain manager can individually power on and off any of a second plurality of nodes in the loop network; and
    a bus number manager in the first power domain manager, the bus number manager determining at least one logical neighbor for each of the first plurality of nodes, the bus number manager ignoring any nodes in the loop network that are in the second power domain in determining the at least one logical neighbor for each of the first plurality of nodes, the bus number manager writing to non-volatile memory in each of the first plurality of nodes bus numbering information for at least one bus in each node and bus numbering information for at least one bus in each logical neighbor node.

2. The clustered computer system of claim 1 wherein the bus numbering information comprises a beginning bus number and a number of buses.

3. The clustered computer system of claim 1 wherein the first power domain manager comprises a non-volatile memory including a bus number mask that indicates bus numbers in use in the first power domain.

4. The clustered computer system of claim 1 wherein the bus number manager detects a change in configuration of the first power domain and reads the bus numbering information from the non-volatile memory in at least one of the first plurality of nodes to determine an appropriate bus number for at least one bus in the first plurality of nodes.

* * * * *